United States Patent
Chazal et al.

(10) Patent No.: US 9,499,064 B2
(45) Date of Patent: Nov. 22, 2016

(54) METHOD FOR OPERATING A MOTOR VEHICLE INCLUDING AN ELECTRIC POWER SUPPLY SYSTEM

(71) Applicant: RENAULT s.a.s., Boulogne-Billancourt (FR)

(72) Inventors: Yann Chazal, Paris (FR); Maria Agapios, Magny les Hameaux (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 9 days.

(21) Appl. No.: 14/416,941

(22) PCT Filed: Jul. 17, 2013

(86) PCT No.: PCT/FR2013/051723
§ 371 (c)(1),
(2) Date: Feb. 19, 2015

(87) PCT Pub. No.: WO2014/016493
PCT Pub. Date: Jan. 30, 2014

(65) Prior Publication Data
US 2015/0202981 A1    Jul. 23, 2015

(30) Foreign Application Priority Data

Jul. 23, 2012 (FR) ..................... 12 57110

(51) Int. Cl.
*B60L 11/18* (2006.01)
*B60L 3/00* (2006.01)
(Continued)

(52) U.S. Cl.
CPC .......... *B60L 11/1861* (2013.01); *B60L 3/0046* (2013.01); *B60L 3/12* (2013.01);
(Continued)

(58) Field of Classification Search
CPC ................ B60L 11/1861; B60L 3/0046; B60L 3/12; B60L 11/14; B60L 11/1805;
(Continued)

(56) References Cited

U.S. PATENT DOCUMENTS

| 5,703,464 A | 12/1997 | Karunasiri et al. |
| 6,232,743 B1 | 5/2001 | Nakanishi et al. |

(Continued)

FOREIGN PATENT DOCUMENTS

| EP | 0 902 520 A2 | 3/1999 |
| WO | 97/01725 A1 | 1/1997 |

OTHER PUBLICATIONS

International Search Report issued Sep. 3, 2013 in PCT/FR2013/051723 filed Jul. 17, 2013.
(Continued)

*Primary Examiner* — Richard Camby
(74) *Attorney, Agent, or Firm* — Oblon, McClelland, Maier & Neustadt, L.L.P.

(57) ABSTRACT

The invention relates to a method for operating a motor vehicle, provided with an electric power supply system and a supervisor for managing the power supply of the vehicle from the power supply system, which comprises an initialization step, carried out by the power supply system, said step triggering an update of a series of parameters of the supervisor, said assembly including at least one physical operating threshold of the power supply system.

10 Claims, 2 Drawing Sheets

(51) Int. Cl.
*B60L 3/12* (2006.01)
*B60L 11/14* (2006.01)

(52) U.S. Cl.
CPC ............ *B60L 11/14* (2013.01); *B60L 11/1805* (2013.01); *B60L 11/1851* (2013.01); *B60L 11/1874* (2013.01); *B60L 11/1875* (2013.01); *B60L 2210/10* (2013.01); *B60L 2210/40* (2013.01); *B60L 2240/545* (2013.01); *B60L 2240/547* (2013.01); *Y02T 10/70* (2013.01); *Y02T 10/7005* (2013.01); *Y02T 10/705* (2013.01); *Y02T 10/7077* (2013.01); *Y02T 10/7216* (2013.01); *Y02T 10/7241* (2013.01)

(58) Field of Classification Search
CPC ............ B60L 11/1874; B60L 11/1875; B60L 2210/10; B60L 2210/40; B60L 2240/545; B60L 2240/547; Y02T 10/7077; Y02T 10/7005; Y02T 10/705; Y02T 10/7241; Y02T 10/7216; Y02T 10/70; Y02T 11/1851

USPC .......................................................... 701/22
See application file for complete search history.

(56) References Cited

U.S. PATENT DOCUMENTS

| 8,749,091 | B2* | 6/2014 | Skarani | G06F 1/263 |
| | | | | 307/10.1 |
| 8,854,010 | B2* | 10/2014 | Obata | H02J 7/0021 |
| | | | | 320/134 |
| 9,073,446 | B2* | 7/2015 | Hani | B60L 3/0069 |
| 2010/0315043 | A1 | 12/2010 | Chau | |
| 2013/0181680 | A1 | 7/2013 | Chau | |

OTHER PUBLICATIONS

French Preliminary Search Report issued Apr. 10, 2013 in French Patent Application No. FR 1257110 filed Jul. 23, 2012.

* cited by examiner

METHOD FOR OPERATING A MOTOR VEHICLE INCLUDING AN ELECTRIC POWER SUPPLY SYSTEM

TECHNICAL FIELD OF THE INVENTION

The invention relates to the field of motor vehicles, in particular of electric vehicles.

The invention more particularly relates to a method for operating a motor vehicle, in particular an electric vehicle, and for managing the electrical supervision of the vehicle.

PRIOR ART

The operational service life of an electric vehicle is significantly longer than the service life of the battery of said vehicle. It will therefore be necessary to replace the battery a number of times during the course of the life of the vehicle.

However, rapid and steady developments are being made with regard to battery chemistry. These developments will lead to the replacement of the production of obsolete battery chemistry with a new generation. Thus, during the course of its life, the vehicle will receive replacement batteries that are mechanically and electrically adapted to the vehicle, but of which the electrochemical limits will be different.

The vehicle ensures the observance of the electrochemical limits of the battery used therein. The supervisor of said vehicle controls the activation of the electric actuators and consumers of the vehicle in order to observe said electrochemical limits depending on thresholds selected for the needs of the battery.

Consequently, when a battery is changed, if the battery is of a new type than it is necessary to return to the dealer in order to update the supervisor such that said supervisor adapts the operation thereof by taking into account the chemistry of the new battery. This solution is not satisfactory.

Document WO2012030455 illustrates the existing operation of a supervisor.

OBJECT OF THE INVENTION

The object of the present invention is to propose a solution that makes it possible to facilitate the exchange of a battery and the consideration thereof by an electric supervisor of the vehicle.

In order to achieve this object the operating method of a motor vehicle provided with an electric power supply system and with a supervisor for managing the electric power supply of the vehicle from the power supply system comprises an initialization step, carried out by the power supply system, said step triggering an update of a series of parameters of the supervisor, said series including at least one physical operating threshold of the power supply system.

The method advantageously comprises a step of replacement of the power supply system which, once the replacement has been carried out, triggers the initialization step.

The initialization step preferably comprises a step of generation of a message including said series of parameters stored in the power supply system, and a step of dispatch of the message generated by the power supply system in the direction of the supervisor.

The series of parameters may include:
a minimum voltage threshold and/or a maximum voltage threshold,
and/or a temperature threshold for activation of the heating of at least part of the power supply system and/or a temperature threshold for activation of the cooling of at least part of the power supply system,
and/or a temperature threshold for interrupting the heating of at least part of the power supply system and/or a temperature threshold for interrupting the cooling of at least part of the power supply system.

In accordance with one implementation the method comprises a step of electric power supply carried out by the power supply system and also comprises, during said power supply step, the generation, by the power supply system in the direction of the supervisor, of a status message comprising a momentary physical operating value of the power supply system.

The method advantageously comprises a step of generation, by the supervisor, of a control signal destined for a component of the vehicle depending on the comparison of the momentary physical operating value received by the supervisor with the associated physical operating threshold provided from the series of parameters of the supervisor.

The invention also relates to an electric power supply system for a motor vehicle, comprising a memory including a series of parameters that include at least one physical operating threshold of said power supply system and including a module for generating a message representative of the series of parameters and for dispatching the message to a receiving module of an electric supervisor of the motor vehicle.

The invention also relates to an electric supervisor for a motor vehicle, including a module for receiving the message provided by the generation module of the electric system according to the example, said receiving module being configured so as to update a parameter of the supervisor on the basis of a series of parameters, including at least one physical operating threshold of the power supply system, contained in the message.

The invention also relates to a motor vehicle including means for implementing the method as described. Said vehicle may comprise a power supply system as described and advantageously a supervisor as described.

The invention also relates to a data recording medium that can be read by a processor on which there is recorded a computer program including computer program code means for implementing steps of the method as described.

The invention also relates to a computer program including a computer program code means suitable for carrying out steps of a method as described when the program is run by a processor.

BRIEF DESCRIPTION OF THE DRAWINGS

Further advantages and features will become clearer from the following description of specific embodiments of the invention, provided by way of non-limiting examples and shown in the accompanying drawings, in which.

DESCRIPTION OF PREFERRED EMBODIMENTS OF THE INVENTION

In the following description the operating method differs from the prior art in that an action, also referred to as an initialization step, carried out by the electric power supply system makes it possible to implement an updating of the supervisor such that said supervisor adapts to the features of the power supply system.

The power supply system may comprise a battery. The battery in turn may comprise a plurality of elementary cells, each constituting an energy source. The power supply system thus makes it possible to store energy for the purpose of restitution thereof. The power supply system may also be configured so as to be recharged, for example by energy dissipated by the vehicle, at a battery exchange station, or by a connection of the vehicle to the grid.

Figure 1:
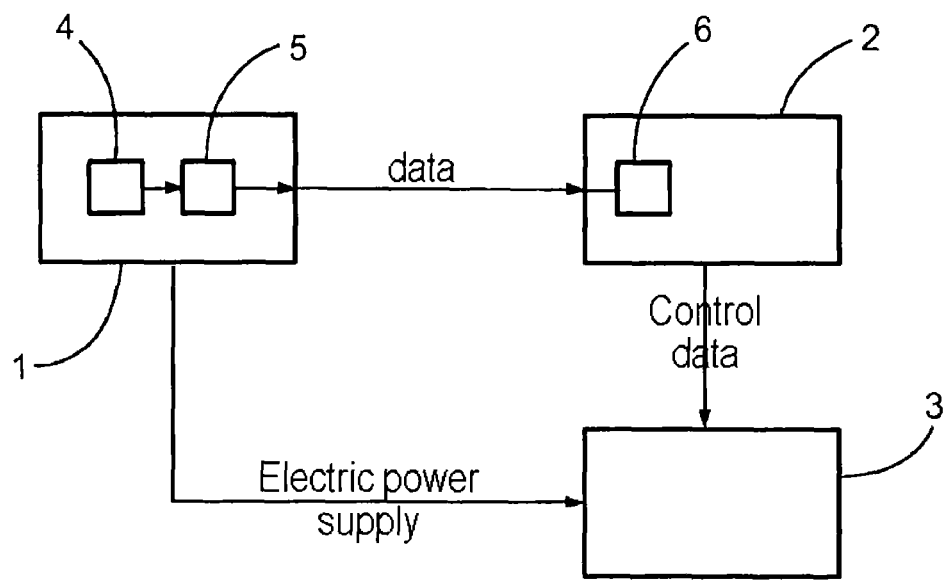
FIG. 1 illustrates schematically a structure enabling the implementation of the operating method of the vehicle.
Figure 2:
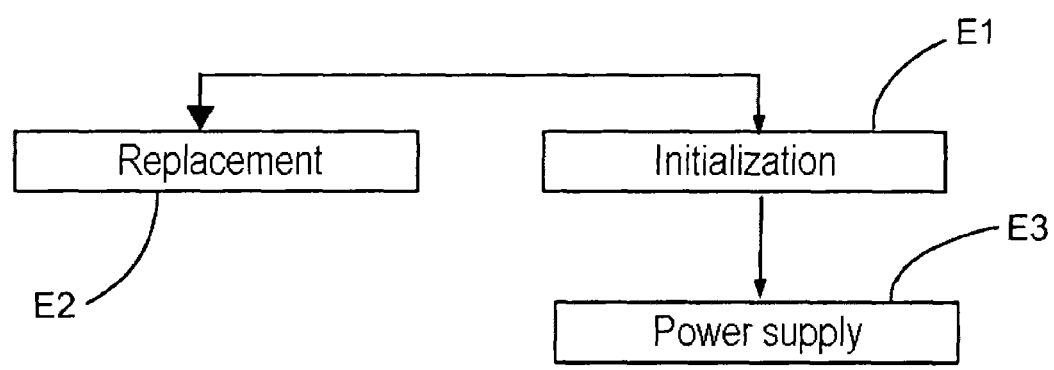
FIG. 2 is a diagram showing different steps of the operating method, FIG. 3 details step E1 of FIG. 2, FIG. 4 details step E3 of FIG. 2.

Thus, for a motor vehicle provided with an electric power supply system 1 and with a supervisor 2 for managing the electric power supply of the vehicle by the power supply system 1 (FIG. 1), the operating method of such a vehicle, illustrated in FIG. 2, may comprise an initialization step E1. The supervisor 2 for managing the power supply is separate from the electric power supply system 1, that is to say it is fixed in the vehicle and is not changed during a replacement of the power supply system.

This initialization step E1 is carried out by the power supply system 1. It makes it possible to trigger an updating of a series of parameters of the supervisor 2. This updating is thus automatic.

The series of parameters includes at least one physical operating threshold of the power supply system 1. Each physical operating threshold may be representative of a physicochemical feature of the battery of the power supply system 1.

Typically, the series of parameters may comprise a single physical threshold or a plurality of physical thresholds intended to be used by the supervisor 2 so as to generate the electric power supply provided by the power supply system 1, for example by controlling at least one component able to influence the behavior of the power supply system, for example by improving the autonomy of the vehicle. A component may in fact be an actuator of the electricity-consuming vehicle.

In a first case the series of parameters may include a minimum voltage threshold and/or a maximum voltage threshold. These voltage thresholds will allow the supervisor 2 to influence the behavior of at least one component so as to keep the battery, or each cell of the battery, between the minimum voltage threshold and the maximum voltage threshold.

In a second case the series of parameters may include a temperature threshold for activation of the heating of at least part of the power supply system 1 and/or a temperature threshold for activation of the cooling of at least part of the power supply system 1.

In a third case the series of parameters may include a temperature threshold for interruption of the heating of at least part of the power supply system 1 and/or a temperature threshold for interruption of the cooling of at least part of the power supply system 1.

Typically, on the basis of the thresholds of the second and third cases, the supervisor 2 will be able to act on a component configured so as to cool or to heat the power supply system 1.

The three cases mentioned above can each be taken individually or in combination.

The series of parameters mentioned above will preferably include all the thresholds in question in the three cases listed.

It has been stated above that the electric power supply system 1 could comprise a battery or a battery provided with a plurality of elementary cells. The thresholds mentioned above may be associated with the battery in general or may be associated so as to supervise each cell of the battery. For example, it will be possible to interrupt the electric consumption if only at least one elementary cell reaches the minimum voltage threshold.

Other thresholds, if useful for the optimization of the operation of the power supply system 1, will also be able to be used such that the supervisor 2 can implement the best strategy for preserving the power supply system 1, both in terms of the integrity thereof and in terms of the autonomy thereof.

The power supply system 1 can be replaced in the case in which it becomes obsolete if the integrity of said power supply system is no longer correct (for example the power supply system may have difficulties in retaining the charge) or in the case of a self-serve station with exchange of power supply system 1.

Consequently, the method may comprise a step of replacement E2 of the power supply system 1 which, once the replacement has been performed, triggers the initialization step E1.

Thus, as soon as the replacement has been performed, the supervisor 2 may initialize without having to visit a dealer.

In fact, the initialization for example can be associated with the presentation of an identification component included on the power supply system 1 opposite a reader, such that the reader transmits identification information to the supervisor 2. The supervisor 2 may then verify the identification of the power supply system 1 and retrieve data in a storage table. This data is then representative of the assembly discussed above. The supervisor could thus connect to an external server in order to retrieve data from the table and store said data, or this data could be selected on the basis of a series of data stored in the vehicle and associated with a number of power supply systems, it being possible to update the series of data, for example after each visit to the after-sales network of the dealer.

Figure 3:
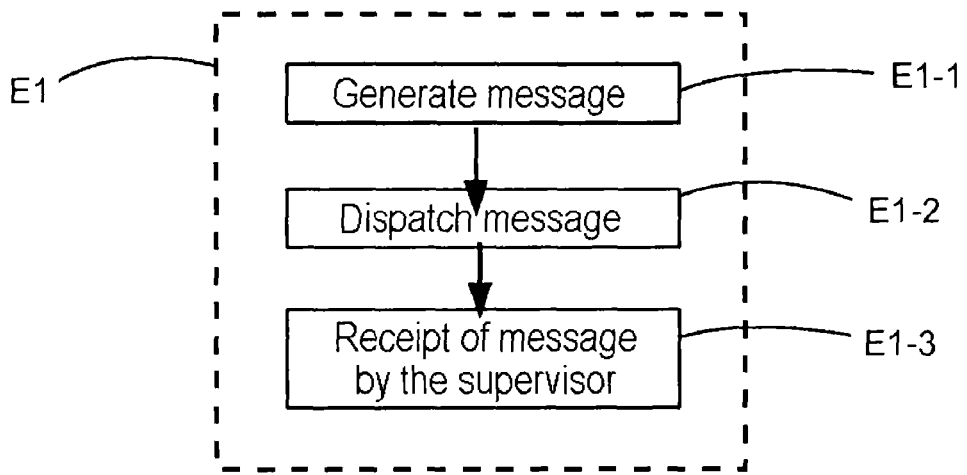

In accordance with an implementation illustrated in FIG. 3, the initialization step (step E1) comprises a step of generation E1-1 of a message including said series of parameters stored in the power supply system 1. In addition, the action of initialization comprises a step of dispatch E1-2 of the message generated by the power supply system 1 in the direction of the supervisor 2.

Consequently, the updating is automated by the power supply system 1 itself. This updating for example can be carried out from receipt (step E1-3) of the message by the supervisor 2.

In addition, the operating method may comprise a step of electric power supply E3 (FIG. 2) carried out by the power supply system 1. During the step of power supply E3, the method comprises the generation (step E3-1 of FIG. 4), by the power supply system 1 in the direction of the supervisor 2, of a status message comprising a momentary physical operating value of the power supply system 1. This status message can then be sent (step E3-2), then received (step E3-3) by the supervisor 2.

The status message may also comprise a number of physical operating values.

The physical operating value may be a momentary operating temperature or a momentary operating voltage.

The power supply step E3 can be of any type and may correspond to the electric power supply of one or more components of the motor vehicle.

In fact, the power supply step E3 may be supervised by the supervisor 2. Generally, the supervisor 2 is connected to at least one component 3 and can adjust the operation thereof, for example on the basis of the series of momentary operating parameters and data provided by the power supply system 1. The components of the vehicle may include an electric motor, a converter (for example of the DC/DC type), a charger converting electricity from the grid in order to supply the power supply system 1, an inverter driving the motor, making it possible to recharge the power supply system 1 by recovering energy from the operation of the vehicle, or a ventilation system intended to cool or to heat the power supply system 1.

Figure 4:
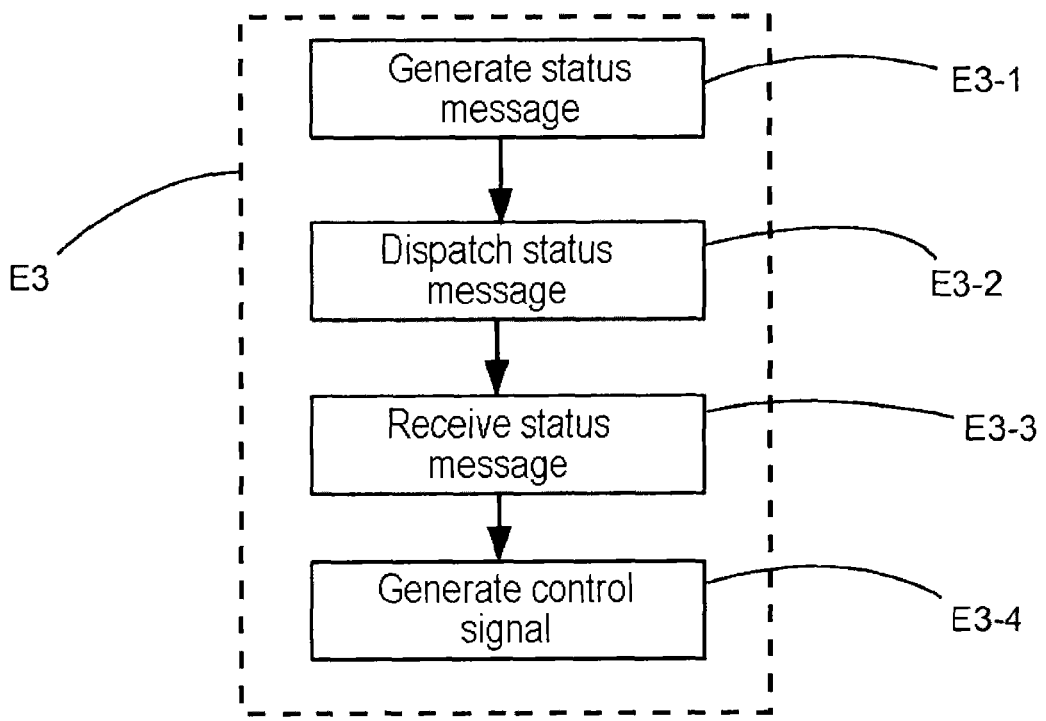

The status message is intended to be used by the supervisor 2 for the purpose of making a decision able to influence the state of the power supply system 1. Thus, the method may comprise a step of generation E3-4, by the supervisor 2, of a control signal intended for a component 3 of the vehicle depending on the comparison of the momentary physical operating value received by the supervisor 2 with the associated physical operating threshold provided by the series of parameters of the supervisor 2. In FIG. 4 the step E3-4 is performed during the power supply step E3.

In other words, during operation, the supervisor 2 can compare momentary values of voltage and/or of temperature originating from the power supply system 1, with corresponding thresholds stored in the series of parameters. This comparison makes it possible to implement suitable protection strategies of the power supply system 1 (activation, interruption, power limitation, electric components of the vehicle, such as the motor inverter, the charger or the thermal conditioning components of the power supply system) in order to observe the constraints of the power supply system 1, in particular of the battery or, at a lower level, of each elementary cell of the battery.

With regard to the messages exchanged between the power supply system and the supervisor, these can use a data bus such as a series bus also referred to in the field as a CAN bus (controller area network). Of course, any type of bus able to exchange data can be used.

It is thus understood that on the one hand messages containing one or more pieces of data are exchanged between the power supply system 1 and on the other hand the supervisor 2 controls the operation of at least one component 3 of the vehicle depending on the data of the messages exchanged. The component, for its part, is supplied electrically by the power supply system 1 in accordance with the needs defined by the supervisor 2.

An electric power supply system 1 for a motor vehicle may preferably comprise a memory 4 (FIG. 1) including a series of parameters that include at least one physical operating threshold of said power supply system 1. This memory may also contain all or some of the physical operating thresholds described above.

In addition, the power supply system 1 may comprise a module 5 for generating a message representative of the series of parameters and for dispatching the message to a receiving module 6 of the supervisor 2 of the motor vehicle.

The electric supervisor 2 for the vehicle may preferably include the module 6 for receiving the message output by the generation module 5 of the power supply system 1, said receiving module 6 being configured so as to update a series of parameters of the supervisor 2 on the basis of a series of parameters, including at least one physical operating threshold of the power supply system 1, contained in the message.

A motor vehicle may include means for implementing, in particular software and hardware, the operating method as described. In particular the implementation means may comprise a power supply system and/or a supervisor as described above.

A data recording medium that can be read by a processor, on which a computer program is recorded, may include computer program code means for implementing steps of the operating method as described.

A computer program may include a computer program code means suitable for carrying out steps of an operating method as described when the program is run by a processor.

It follows from the above that such a method allows a vehicle to adapt its operation almost instantaneously to the new electrochemical constraints of the battery of a replacement power supply system and to thus avoid the constraints of reprogramming at the dealer.

A further advantage is that, in the case of a change of the power supply system in an exchange service station, it is possible to equip the vehicle with a number of types of battery depending on availability, moreover in a manner transparent to the driver. Of course, it goes without saying that the electrical and mechanical interface of replacement power supply systems is adapted to the vehicle. The operating method as described above can thus be implemented with each visit to a service station as soon as a power supply system exchange is requested.

The operating method can be implemented in a hybrid vehicle or in an electric vehicle. Thus, the power supply system may comprise a high-voltage battery configured so as to allow electric propulsion or to assist thermal propulsion of a vehicle by supplying power to an electric motor.

The invention claimed is:

1. A method for operating a motor vehicle provided with an electric power supply system and a supervisor for managing the electric power supply of the vehicle from the power supply system, the supervisor being fixed to the vehicle such that the supervisor is not changed when the power supply system is replaced, the method comprising:
   initializing the supervisor, the initializing being performed by the power supply system, said initializing including triggering an update of a series of parameters stored on the supervisor, said series including at least one physical operating threshold of the power supply system.

2. The method as claimed in claim 1, further comprising:
   replacing the power supply system which, once the replacing has been carried out, triggers the initializing.

3. The method as claimed in claim 1, wherein the initializing comprises generating a message including said series of parameters stored in the power supply system, and dispatching the message generated by the power supply system in the direction of the supervisor.

4. The method as claimed in claim 1, wherein the series of parameters includes:
   a minimum voltage threshold and/or a maximum voltage threshold,
   and/or a temperature threshold for activation of heating of at least part of the power supply system and or a temperature threshold for activation of cooling of at least part of the power supply system,
   and/or a temperature threshold for interrupting the heating of at least part of the power supply system and/or a temperature threshold for interrupting the cooling of at least part of the power supply system.

5. The method as claimed in claim 1, further comprising:
   supplying electric power by the power supply system, and, during said supplying, a status message is generated by the power supply system in the direction of the supervisor, the status message comprising a momentary physical operating value of the power supply system.

6. The method as claimed in claim 5, further comprising:
generating, by the supervisor, a control signal destined for a component of the vehicle depending on a comparison of a momentary physical operating value received by the supervisor with an associated physical operating threshold provided from the series of parameters of the supervisor.

7. An electric power supply system for a motor vehicle, comprising:
a memory including a series of parameters that include at least one physical operating threshold of said power supply system;
a module for generating a message representative of the series of parameters and for dispatching the message to a receiving module of an electric supervisor of the motor vehicle,
wherein the electric power supply system is replaceable in the motor vehicle and the supervisor is fixed to the vehicle such that the supervisor is not replaced with the electric power supply system.

8. An electric supervisor for a motor vehicle, comprising:
a module for receiving the message provided by the generation module of the system as claimed in claim 7, said receiving module being configured so as to update a series of parameters of the supervisor on the basis of a series of parameters, including at least one physical operating threshold of the power supply system, contained in the message.

9. A motor vehicle, comprising:
an electric power supply system; and
a supervisor for managing the electric power supply of the vehicle from the power supply system, the supervisor being fixed to the vehicle such that the supervisor is not changed when the power supply system is replaced,
wherein the power supply system is configured to initialize the supervisory by triggering an update of a series of parameters stored on the supervisor, said series including at least one physical operating threshold of the power supply system.

10. A non-transitory data recording medium that can be read by a processor, the medium storing a computer program that, when executed by a computer, causes the computer to execute the method as claimed in claim 1.

* * * * *